(12) United States Patent
Gilbreath et al.

(10) Patent No.: US 7,177,028 B2
(45) Date of Patent: Feb. 13, 2007

(54) REUSABLE, HIGH STIFFNESS, MAGNETIC SHIELD FOR FIBER OPTIC GYROSCOPES

(75) Inventors: David M. Gilbreath, Layton, UT (US); Richard Anderson, Draper, UT (US); Devadas Dorai-Raj, Newport Beach, CA (US); Arthur D. Lang, Park City, UT (US)

(73) Assignee: Litton Systems, Inc., Woodland Hills, CA (US)

( * ) Notice: Subject to any disclaimer, the term of this patent is extended or adjusted under 35 U.S.C. 154(b) by 217 days.

(21) Appl. No.: 10/870,320

(22) Filed: Jun. 17, 2004

(65) Prior Publication Data
US 2005/0041252 A1    Feb. 24, 2005

Related U.S. Application Data

(60) Provisional application No. 60/479,348, filed on Jun. 17, 2003.

(51) Int. Cl.
*G01C 19/72* (2006.01)
(52) U.S. Cl. ..................................... 356/460
(58) Field of Classification Search ................ 356/459, 356/460, 461, 462, 463, 464, 465, 466; 174/35 MS; 147/35 MS, 35 R
See application file for complete search history.

(56) References Cited

U.S. PATENT DOCUMENTS 5,822,065 A * 10/1998 Mark et al. ................. 356/465
6,259,849 B1 * 7/2001 McLean et al. ............. 356/460
6,320,664 B1 * 11/2001 Kaliszek et al. ............ 356/465
6,462,824 B1 * 10/2002 McLean et al. ............. 356/465

* cited by examiner

*Primary Examiner*—Gregory J. Toatley, Jr.
*Assistant Examiner*—Marissa J. Detschel
(74) *Attorney, Agent, or Firm*—Lewis B. Sternfels

(57) ABSTRACT

A spool (12), for supporting a fiber optic coil (14) and a shield (118) surrounding the spool and fiber optic coil, includes a centrally placed, bolt-receiving opening (29). The shield includes a lower shield portion (20), which supports the spool and the fiber optic coil, and an upper shield portion (118). The upper and lower shield portions are arranged to interfit with each other at an interface (121). The upper shield portion has a centrally placed fastener-receiving opening (124) which is alignable with the centrally placed, bolt-receiving opening of the spool. A bolt (156) has a head (156a), a shank (156b) and a threaded end (156c, 156d). The bolt head is engageable with the spool through intermediary structure (48). The shank is insertable through the centrally placed, bolt-receiving opening (29) and the lower shield opening (26), for radially centering the assembly and its components. The threaded end is disposed to engage a threaded opening (68) in a gyroscope assembly support (66). A threaded, centrally placed opening (156e) is located in the bolt head. A screw (164) is couplable with the upper shield portion and screwable into the bolt head threaded opening for securing the upper shield portion both to the lower shield portion and to the bolt.

10 Claims, 2 Drawing Sheets

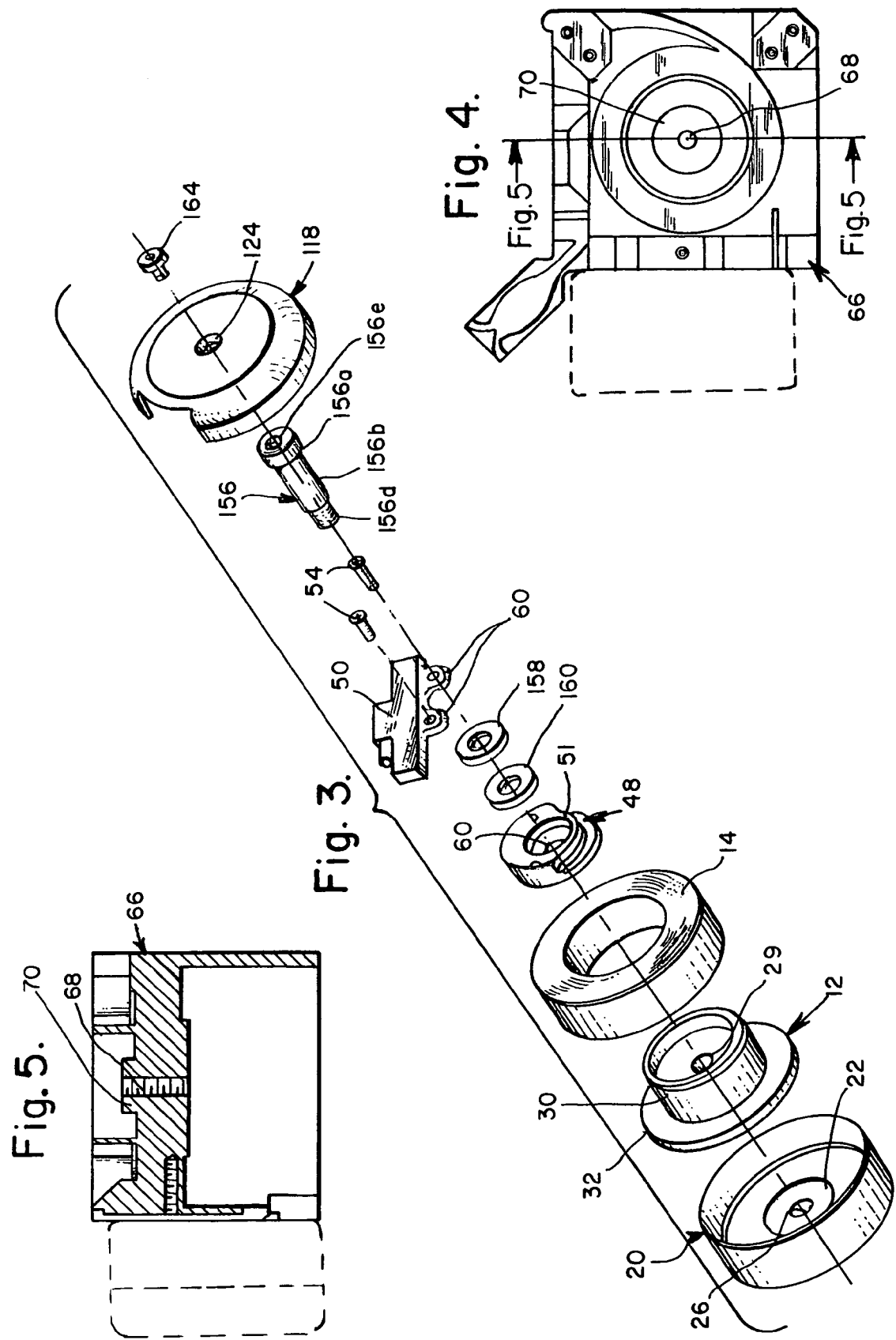

REUSABLE, HIGH STIFFNESS, MAGNETIC SHIELD FOR FIBER OPTIC GYROSCOPES

CROSS-REFERENCE TO RELATED APPLICATION

This application claims the benefit of U.S. Provisional Application No. 60/479,348, filed 17 Jun. 2003.

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to fiber optic gyroscopes and, more particularly, to reusable, high stiffness, magnetic shielding therefor.

2. Description of Related Art and Other Considerations

A fiber optic gyroscope includes a fiber optic coil, which is conventionally mounted on a spool, and related components housed and secured within a shield of permeable ferromagnetic material which acts to protect the coil from undesirable electromagnetic energy that would otherwise deleteriously affect operation of the gyroscope. In one known construction, the shield comprises a two-component arrangement of a base shield and a cover shield, with the spool-mounted fiber optic coil being positioned on and bonded to the base shield. The base and the cover shields are also bonded together. Before bonding, shims are used to center the spool within the base shield, and to adjust the positioning of the cover shield in a level position. A bolt with washers is inserted through an opening in the cover shield and through the spool to secure the gyroscope to a mount.

This construction requires thirty-six assembly steps, involving the use of fixturing, shimming and semi-permanent bonding of the cover and base shields. A substantial amount of time is required to complete the assembly due to the need for extensive tooling and worker time, including a series of tooling/shimming steps and final securing of the cover and base shields together. Thereafter, when the device was tested and a defect was found, the failure was invariably found to be due to some gyroscopic malfunction. It was then necessary to separate the cover and base shields from one another to perform rework and repair on the internal components. Such separation of the shields always resulted in their destruction and furthermore caused damage to one or more of the internal components. The consequence was scrapping of damaged parts, and the need to perform additional rework and repair, with attendant reassembly time.

This known gyroscope is also subject to the production of resonant frequency and vibration problems with respect to the airframe to which it is attached. The airframe has a operational range of frequencies. The coupling of the cover shield solely to the lower shield and, thereby, to the remainder of the gyroscope assembly permits the cover shield to be exposed to vibrational forces and to the resultant production of resonant frequencies. Because of the construction of the above-described known gyroscope, its resonant frequencies were found to be too close to the range of airframe frequencies, which produced a potential for vibrationally induced gyroscopic failures, specifically, the gyroscope would not perform correctly and, therefore, would produce erroneous signals that are unrelated to the navigational inputs to the device.

SUMMARY OF THE INVENTION

These and other problems are successfully addressed and overcome by the present invention by reorienting the attachment and relationship between the cover and base shields, by specifying close tolerances on all parts, by utilizing the bolt as a centering medium, and by dispensing with all bonding.

More particularly, the preferred embodiment of the present invention comprises a spool for supporting a fiber optic coil and a shield surrounding the spool and fiber optic coil. The spool includes a centrally placed, bolt-receiving opening. The shield includes a lower shield portion, which supports spool and the fiber optic coil, and an upper shield portion. The upper and lower shield portions are arranged to interfit with each other. The upper shield portion has a centrally placed fastener-receiving opening which is alignable with the centrally placed, bolt-receiving opening of the spool.

A bolt has a head, a shank and a threaded end. The bolt head is engageable with the spool through intermediary structure. The shank is insertable through the centrally placed, bolt-receiving opening and engages the lower shield simultaneously to properly center the entire assembly. The threaded end is disposed to engage a threaded opening in a gyroscope assembly support. A threaded, centrally placed opening is located in the bolt head. A screw is couplable with the upper shield portion and screwable into the bolt head threaded opening for securing the upper shield portion both to the lower shield portion and to the bolt.

Several advantages are achieved thereby. Securement of the upper shield to the bolt prevents it from vibrating and, therefore, to otherwise resultant resonant frequencies. Disassembly and reassembly of the gyroscopic assembly is enabled, without possible destruction thereto in the event that rework on the assembly is required. The number of operational assembly and disassembly steps is considerably reduced from prior assemblies.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 3 is an exploded view of the construction depicted in FIG. 2;

FIG. 4 is a top view of a base to which the construction shown in FIG. 2 is secured; and FIG. 5 is a cross-sectional side view of the base illustrated in FIG. 4 taken along line 5—5 thereof.

DETAILED DESCRIPTION OF THE PREFERRED EMBODIMENTS

Figure 1:
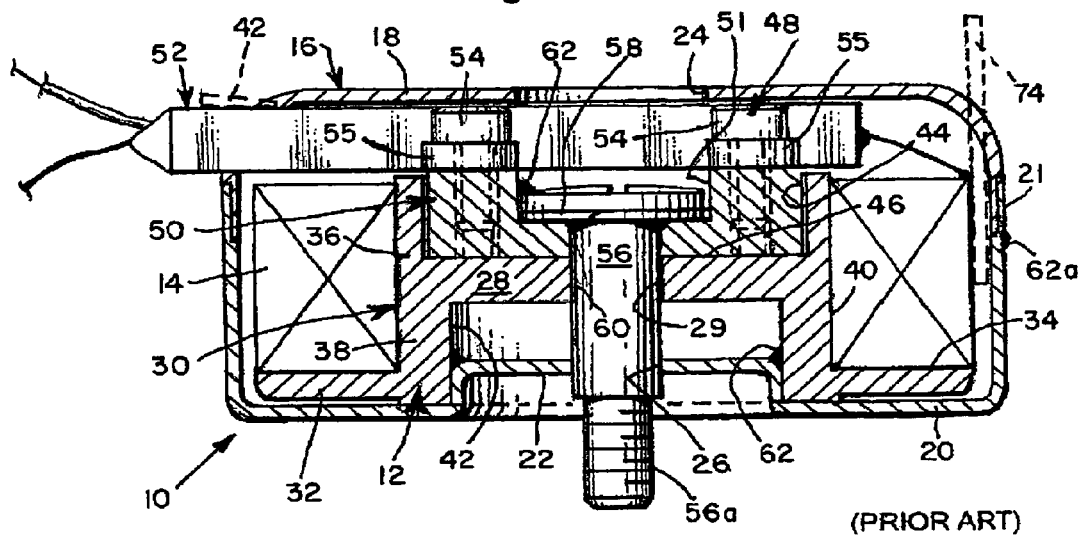
FIG. 1 is cross-sectional view of a prior used magnetic shield of known construction for a fiber optic gyroscope.

As depicted in FIG. 1, a gyroscopic assembly 10 of known construction comprises a spool 12, an optical fiber coil 14 secured to and supported by the spool, and an outer or external shield 16. Shield 16 comprises an upper shield portion 18 and a lower shield portion 20, which are joined at an interface 21. The interface typically comprises a pair of interfacing and overlapping termini so that all shield portions are consistent for providing uniform magnetic shielding properties. An inwardly extending platform support 22 is formed centrally within lower shield portion 20. Central access openings 24 and 26 are placed respectively in shield portions 18 and 20, and platform support 22.

Spool 12 includes a central section 28 with an opening 29 therein, a tubular wall 30, and a base 32 having an upper surface 34. Tubular wall 30, in turn, is divided into an upwardly extending wall portion 36 and a downwardly extending wall portion 38, from which base 32 extends. The upwardly and downwardly extending wall portions form a cylindrical outer wall 40 which, with base upper surface 34, form an annularly L-shaped seat for supporting coil 14. Downwardly extending wall portion 38 further defines an interior cylindrical, cup-shaped opening 42 which is disposed to fit about and seat on platform support 22.

Upwardly extending wall portion 36 and central section 28 respectively have an inner cylindrical surface 44 and an upper surface 46 which form an inner opening. A subassembly 48 is partially received within the inner opening formed by surfaces 44 and 46, and comprises a generally ring-shaped member 50, having a central recess 51, and an optical fiber holder 52. The fibers in fiber optic coil 14 terminate in fiber holder 52 for coupling the coil to external optical circuitry. Holder 52 is secured to the ring-shaped member by any suitable means, such as by set screws 54, which extend through lock washers 55. Ring-shaped member 50 is received within the inner opening defined by surfaces 44 and 46.

A bolt 56 extends through a lock washer 58, a central opening 60 in the ring-shaped member and opening 26 in platform support 22 for securing gyroscope assembly 10 to a gyroscope assembly support 66, as shown in FIGS. 4 and 5. Here, support 66 is provided with a centrally positioned threaded opening 68 and a circular mesa 70. The mesa is configured to accept, and be surrounded by platform support 22. It is apparent, therefore, that the securing of gyroscope assembly 10 to gyroscope assembly support 66 is effected by the threaded engagement of threads 56a of bolt 56 within threaded opening 68 of the support. Bolt 56 as well secures ring-shaped member 50 to spool 12 within the opening defined by surfaces 44 and 46.

Several differently placed adhesive joints 62, which are respectively formed between bolt 56 and inner tubular surface 44, between cup-shaped opening 42 and platform support 22 and at shield portion interface 22, bond the gyroscope shields together.

Prior to placing upper shield portion 18 onto lower shield portion 20 and bonding them together, shims such as those referred to by indicia 72 and 74 are inserted as shown to orient and center the several elements within the gyroscope assembly. These shims are inserted generally at three points about the circumference as represented by one of the three locations that are illustrated in FIG. 1.

As stated above, the coupling of cover or upper shield portion 18 solely to lower shield portion 20 exposed the upper shield to vibration and, thus, to resonate at frequencies that were too close to the range of airframe frequencies, with the resultant potential for vibrationally induced gyroscopic failures. Further, adhesive joints 62 created difficulties in repair of the assembly.

Figure 2:
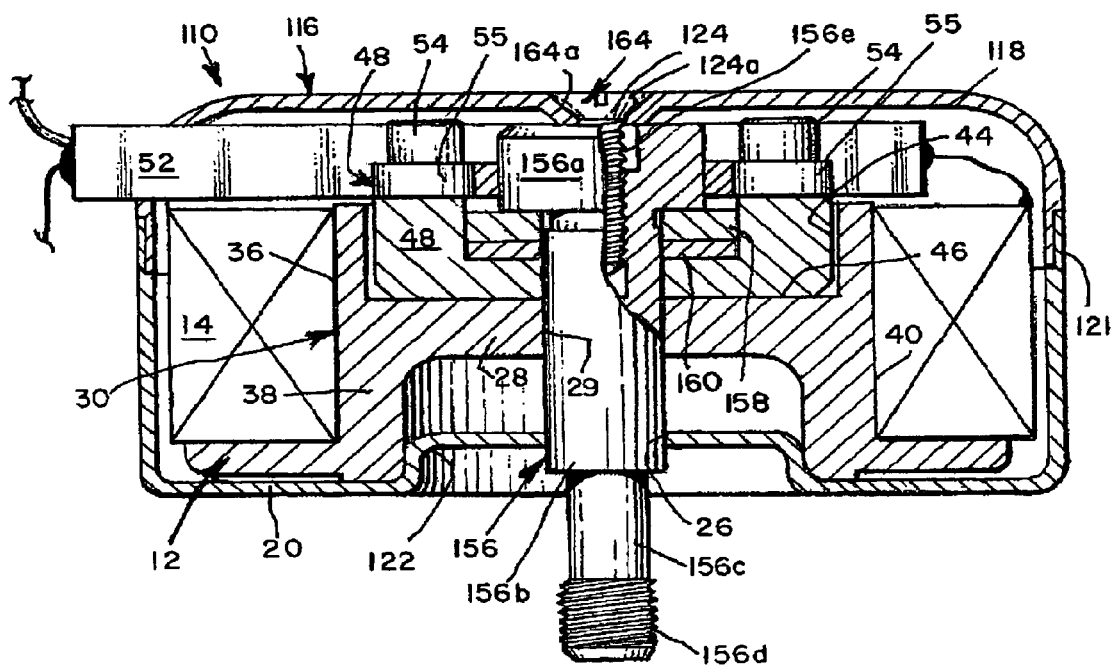
FIG. 2 is cross-sectional view of an improved magnetic shield for a fiber optic gyroscope, as constructed in accordance with the present invention.

Reference is now made to a preferred embodiment of the present invention depicted in FIGS. 2 and 3, illustrated as a gyroscope assembly 110. In this preferred embodiment, the reference numerals used in FIGS. 2 and 3 are the same as those used in FIG. 1 where the parts of gyroscope assemblies 10 and 110 are the same. The same parts include spool 12, optical fiber coil 14, interface 21.

In FIGS. 2 and 3, an outer or external shield 116 includes an upper shield portion 118 and a lower shield portion 120. Upper shield portion 118 is provided with an opening 124 having an inwardly beveled wall 124a. A bolt 156 includes a head 156a, a shank 156b and an extension 156c with threads 156d at its terminus. Shank 150b provides a self-centering arrangement with lower shield portion 120 and spool 12 to align the assembly and its constituent parts radially. An internally threaded opening 156e extends through head 156a and into shank 156b. A washer 158 and a lock washer 160 are placed between head 156a and subassembly 48.

A screw 164 with a beveled head 164a extends through opening 124. The beveled head of screw 164 is adapted to bear against inwardly beveled wall 124a of upper shield portion 118. When screw 164 is threaded into internally threaded opening 156e, its head 164a draws the upper shield essentially into secure engagement with bolt head 156a and, at the same time, secures two shield portions 118 and 120 together at their interface without the need for any weld, such as weld 62a required in gyroscopic assembly 10 of FIG. 1. More specifically, some spring room is left between the parts to enable the upper and lower shield portions to be clamped together. Accordingly, a torquing on screw 164 leaves a space between the upper shield portion and bolt 156. This provides sufficient contact on upper shield portion 118 and thus avoids resonance problems. This securing of upper shield portion 118 also prevents flexing and vibration thereof in contradistinction to that permitted by the construction of gyroscope assembly 10, and militates against the production of deleterious resonant frequencies.

Further, when it is required to perform any rework of gyroscope assembly 110, it is only necessary simply to unthread screw 164 from bolt 156 and this bolt from support 66 and, thereafter to reassemble the device after corrections have been made or rework has been performed.

Gyroscope assembly 110, like gyroscope assembly 10, is secured to gyroscope structure 66 by bolt 156, whose threaded extension 156c engages threaded opening 68 of gyroscope assembly support 66. Lock washer 160 helps to assure securing the assembly 110 to support 66.

Although the invention has been described with respect to a particular embodiment thereof, it should be realized that various changes and modifications may be made therein without departing from the spirit and scope of the invention.

What is claimed is:

1. A reusable, high stiffness, magnetic shield in combination with a fiber optic gyroscope comprising:

a support for supporting a fiber optic coil and including a centrally placed, bolt-receiving opening;

a shield including a lower shield portion for supporting the fiber optic coil support and an upper shield portion disposed to interfit with said lower shield portion, said lower and upper shield portions having respective centrally placed fastener-receiving openings alignable with the centrally placed, bolt-receiving opening of said support;

a bolt having a head engageable with said support, a shank insertable through the centrally placed, bolt-receiving openings in said lower and upper shield portions for effecting a self-centering component mechanism;

an attachment medium associated with said bolt head; and a fastener couplable with said upper shield portion and said bolt head attachment medium for securing said upper shield portion both to said lower shield portion and to said bolt.

2. A combination according to claim 1 in which said fastener couplable with said upper shield portion comprises a screw having a head contactable with said upper shield portion and a threaded shank, and said attachment medium associated with said bolt head comprises threads disposed to be engaged by said threaded shank of said screw for clamping said upper shield portion to said bolt head.

3. A combination according to claim 2 further comprising a base having a threaded opening therein, and said bolt shank includes threads for enabling said bolt to be secured to said base and thereby to secure said shield to said base.

4. A combination according to claim 1 further comprising a base having a threaded opening therein, and said bolt shank includes threads for enabling said bolt to be secured to said base and thereby to secure said shield to said base.

5. A combination according to claim 1 in which said lower shield portion includes a centrally placed opening, though which both said lower shield and said support centrally placed openings said bolt shank extends for mutually centering of said support, said fiber optic coil, and said lower shield.

6. A reusable, high stiffness, magnetic shield in combination with a fiber optic gyroscope comprising:
   a support for supporting a fiber optic coil and including a centrally placed fastener-receiving opening;
   a shield including a lower shield portion for supporting the fiber optic coil support and an upper shield portion disposed to interfit with said lower shield portion, said upper shield portion having a centrally placed fastener-receiving opening alignable with the centrally placed, fastener-receiving opening of said support;
   a first fastener engageable with said support and insertable through its centrally placed, fastener-receiving opening, and an attachment medium associated with said first fastener; and
   a second fastener couplable with said upper shield portion and said first fastener for securing said upper shield portion both to said lower shield portion and to said first fastener.

7. A combination according to claim 6 in which said support comprises a spool.

8. A combination according to claim 6 in which said lower shield portion includes a centrally placed opening, though which both said lower shield and said support centrally placed openings said first fastener extends for mutual centering of said support, said fiber optic coil, and said lower shield.

9. In a fiber optic gyroscope assembly having a support for supporting a fiber optic coil, a shield including a lower shield portion for supporting the fiber optic coil support and an upper shield portion disposed to interfit with the lower shield portion, and a fastener couplable with the fiber optic coil support for fastening the gyroscope assembly to a gyroscope assembly support, a method for providing a reusable, high stiffness, magnetic shield, comprising the steps of:
   providing the fiber optic coil support with a centrally placed fastener-receiving opening;
   providing the upper shield portion with a centrally placed fastener-receiving opening alignable with the centrally placed, fastener-receiving opening of the support; and
   fastening the upper shield portion to the fastener.

10. A method according to claim 9 further comprising the step of providing the lower shield portion with a centrally placed opening, and extending the fastener though both the lower shield and the support centrally placed openings for mutually centering of said support, said fiber optic coil, and said lower shield.

* * * * *